(12) United States Patent
Enomoto et al.

(10) Patent No.: US 7,777,840 B2
(45) Date of Patent: Aug. 17, 2010

(54) TRANSFLECTIVE LIQUID CRYSTAL DISPLAY DEVICE HAVING FIRST AND SECOND DATA DRIVERS AND GENERATING FIRST AND SECOND SIGNALS OF DIFFERENT VOLTAGE VALUES

(75) Inventors: Hiromi Enomoto, Kawasaki (JP); Susumu Okazaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 460 days.

(21) Appl. No.: 11/079,931

(22) Filed: Mar. 14, 2005

(65) Prior Publication Data

US 2006/0050208 A1    Mar. 9, 2006

(30) Foreign Application Priority Data

Sep. 9, 2004 (JP) ............................... 2004-262713

(51) Int. Cl.
*G02F 1/1343* (2006.01)
*G02F 1/1335* (2006.01)

(52) U.S. Cl. .................. 349/114; 349/39; 345/98; 345/99; 345/100; 345/103

(58) Field of Classification Search ................. 349/114, 349/39
See application file for complete search history.

(56) References Cited

U.S. PATENT DOCUMENTS

| 5,870,075 | A | | 2/1999 | Yamazaki et al. | |
|---|---|---|---|---|---|
| 5,923,311 | A | * | 7/1999 | Edwards | 345/92 |
| 6,600,470 | B1 | | 7/2003 | Tsuda | |
| 6,806,929 | B2 | | 10/2004 | Chen et al. | |
| 7,084,942 | B2 | * | 8/2006 | Luo | 349/114 |
| 2002/0047822 | A1 | | 4/2002 | Senda et al. | |
| 2003/0184695 | A1 | * | 10/2003 | Chen et al. | 349/113 |
| 2003/0214472 | A1 | * | 11/2003 | Chen | 345/87 |
| 2004/0095530 | A1 | * | 5/2004 | Itoh et al. | 349/114 |
| 2005/0057231 | A1 | * | 3/2005 | Morita | 323/268 |

FOREIGN PATENT DOCUMENTS

| JP | 08-211407 | 8/1996 |
|---|---|---|
| JP | 2000-147455 | 5/2000 |
| JP | 2002-333870 | 11/2002 |
| JP | A 2003-222890 | 8/2003 |
| JP | A 2003-295159 | 10/2003 |
| TW | 544940 | 8/2003 |

* cited by examiner

*Primary Examiner*—David Nelms
*Assistant Examiner*—Lauren Nguyen
(74) *Attorney, Agent, or Firm*—Greer, Burns & Crain, Ltd.

(57) ABSTRACT

A reflective electrode, a transparent electrode, a TFT connected to the reflective electrode and a TFT connected to the transparent electrode are formed in each picture element. A first data signal is written into the reflective electrode via the TFT, a second data signal is written into the transparent electrode via the TFT. In this way, the individual data signals are respectively written into the reflective electrode and the transparent electrode, and thereby excellent display quality can be obtained either when used as a transmissive liquid crystal display device or when used as a reflective liquid crystal display device.

5 Claims, 12 Drawing Sheets

TRANSFLECTIVE LIQUID CRYSTAL DISPLAY DEVICE HAVING FIRST AND SECOND DATA DRIVERS AND GENERATING FIRST AND SECOND SIGNALS OF DIFFERENT VOLTAGE VALUES

CROSS-REFERENCE TO RELATED APPLICATIONS

This application is based on and claims priority of Japanese Patent Application No.2004-262713 filed on Sep. 9, 2004, the entire contents of which are incorporated herein by reference.

BACKGROUND OF THE INVENTION

1. Field of the Invention

The present invention relates to a transflective liquid crystal display device for displaying images by use of a backlight under dark conditions and by use of reflection of external light under well-lit conditions.

2. Description of the Prior Art

Liquid crystal display devices are advantageous in that they are thin and light, as well as have low power consumption characteristics owing to its low-voltage drive capability, and are therefore widely used in various electronic devices. In particular, active matrix liquid crystal display devices including thin film transistors (TFTs) provided in respective picture elements as switching elements also exhibit excellent display quality equivalent to cathode-ray tubes (CRTs). Accordingly, they are widely used for televisions, displays for personal computers or the like.

In general, a liquid crystal display device includes two substrates placed to face each other, and liquid crystals sealed between the substrates. TFTs, picture element electrodes and the like are formed on one of the substrates, while color filters, a common electrode and the like are formed on the other substrate. The substrate on which the TFTs, the picture element electrodes, and the like are formed will be hereinafter referred to as a TFT substrate, and the substrate to be placed to face the TFT substrate will be hereinafter referred to as an opposing substrate. Furthermore, a structure formed by sealing the liquid crystal between the TFT substrate and the opposing substrate will be hereinafter referred to as a liquid crystal display panel.

A liquid crystal display device includes a transmissive liquid crystal display device, a reflective liquid crystal display device and a transflective liquid crystal display device. The transmissive liquid crystal display device has a backlight as a light source and displays images by use of light which passes through a liquid crystal panel. The reflective liquid crystal display device displays images by use of reflection of external light (natural light or lamplight). The transflective liquid crystal display device displays images by use of a backlight under dark conditions and by use of reflection of external light under well-lit conditions.

FIG. 1 is a perspective view showing the configuration of a conventional transflective liquid crystal display device, FIG. 2 is a plan view showing one picture element of the same transflective liquid crystal display device, and FIG. 3 is a cross-sectional view taken along the I-I line in FIG. 2. Note that, here, a description will be given of a VA (vertically aligned) mode transflective liquid crystal display device employing vertical alignment-type liquid crystals (liquid crystals having negative dielectric anisotropy).

As shown in FIG. 1, the transflective liquid crystal display device includes a liquid crystal panel 5, a drive circuit board 6 which is connected to the liquid crystal panel 5 and supplies driving signals (data signals and gate signals), a backlight unit 7 placed on one surface side of the liquid crystal panel 5 (under the liquid crystal panel 5 in FIG. 1), and a pair of circularly polarizing plates (not shown) placed so as to sandwich the liquid crystal panel 5.

As shown in FIG. 3, the liquid crystal panel 5 includes a TFT substrate 10, an opposing substrate 30, and a liquid crystal layer 40 formed of liquid crystals sealed between the substrates. The liquid crystal panel 5 is driven by integrated circuits (ICs) mounted on the drive circuit board 6 and by a driving circuit constituted of ICs 5a and 5b mounted on the periphery of the liquid crystal panel 5.

As shown in FIG. 2, gate bus lines 12 extending in the horizontal direction (X direction) and data bus lines 15 extending in the vertical direction (Y direction) are formed in a display unit of the TFT substrate 10. Each of the rectangular regions defined by the gate bus lines 12 and the data bus lines 15 constitutes a picture element region. In addition, the TFT substrate 10 is provided with auxiliary capacitor bus lines 13 which are formed in parallel with the gate bus lines 12 and crosses the picture element regions.

A TFT 16, an auxiliary capacitor electrode 18, a reflective electrode 20 and a transparent electrode 21 are formed in each picture element region. As for the reflective electrode 20, at least the surface thereof is made of metal having high reflectance such as aluminum (Al). The transparent electrode 21 is made of a transparent conductive material such as indium tin oxide (ITO), for example. The region in which the reflective electrode 20 is formed is referred to as a reflective region, and the region in which the transparent electrode 21 is formed is referred to as a transmissive region.

The TFT 16 uses a part of the gate bus line 12 as a gate electrode. A drain electrode 16d and a source electrode 16s are placed to face each other across the gate bus line 12. The drain electrode 16d is connected to the data bus line 15. Further, the source electrode 16s is connected to a pad 17a and the auxiliary capacitor electrode 18 via a wiring 17. Furthermore, the source electrode 16s is electrically connected to the reflective electrode 20 and the transparent electrode 21 via contact holes 19a and 19b.

Hereinafter, the layered structure of the TFT substrate 10 and the opposing substrate 30 will be described with reference to FIG. 3.

The gate bus line 12 made of metal film such as a chrome (Cr) film and a laminated film of aluminum (Al)-Titanium (Ti), and the auxiliary capacitor bus line 13 are formed on a glass substrate 11 which is the base for the TFT substrate 10. In addition, a first insulating film (gate insulating film) 14 made of $SiO_2$, SiN or the like is formed on the glass substrate 11, gate bus line 12 and the auxiliary capacitor bus line 13.

A semiconductor film 16a to be an active layer of the TFT 16 is formed on a predetermined region of the first insulating film 14. Further, a channel protection film 16b made of SiN is formed on the region of the semiconductor film 16a to be a channel. The source electrode 16s and the drain electrode 16d of the TFT 16 are formed with the channel protection film 16b interposed. The drain electrode 16d is connected to the data bus line 15 formed on the first insulating film 14. The source electrode 16s is connected to the pad 17a and the auxiliary capacitor electrode 18 via the wiring 17 formed on the first insulating film 14. The auxiliary capacitor electrode 18 is formed on a position facing the auxiliary capacitor bus line 13 with the first insulating film 14 interposed therebetween, thereby constituting an auxiliary capacitor together with the auxiliary capacitor bus line 13 and the first insulating film 14.

The TFT 16, the data bus line 15, the wiring 17, the auxiliary capacitor electrode 18 and the like are all covered with a second insulating film 19. The reflective electrode 20 and the transparent electrode 21 are formed on the second insulating film 19. The reflective electrode 20 is electrically connected to the pad 17a via the contact hole 19a. The transparent electrode 21 is electrically connected to the auxiliary capacitor electrode 18 via the contact hole 19b. The surfaces of the reflective electrode 20 and the transparent electrode 21 are covered with a vertical alignment film 22 made of polyimide or the like.

Meanwhile, a black matrix (light blocking film) 32 and a color filter 33 are formed on a glass substrate (lower surface in FIG. 3) which is the base for the opposing substrate 30. The black matrix 32 is formed of, for example, a light blocking material such as Cr, and is placed on positions facing the regions on the TFT substrate 10, where the gate bus line 12, the data bus line 15, the auxiliary capacitor electrode 13 and the TFT 16 are to be formed.

The color filter 33 is classified into three types of red (R), green (G), and blue (B), each of which selectively allows light having a predetermined wavelength range to pass through. The color filter 33 of any one color is placed in each picture element, and three picture elements of red (R), green (G), and blue (B) which are adjacently placed constitute one pixel, thereby making it possible to display various colors.

A common electrode 34 made of a transparent conductive material is formed on the color filter 33 (lower surface in FIG. 3) so as to face both the reflective electrode 20 and the transparent electrode 21 of each picture element. The surface of the common electrode 34 is covered with a vertical alignment film 35 made of polyimide or the like.

In the transflective liquid crystal display device constituted as described above, when a voltage is not applied between the common electrode 34 and both of the reflective electrode 20 and the transparent electrode 21, the liquid crystal molecules in the liquid crystal layer 40 are aligned substantially perpendicular to the substrate surfaces. In this case, in the transmissive region, the light emitted from the backlight unit 7 passes through both the circularly polarizing plate placed below the panel and the transparent electrode 21, and then enters the liquid crystal layer 40 and passes through the liquid crystal layer 40 without being changed its polarization direction. Thereafter, the light is blocked by the circularly polarizing plate placed above the panel. Specifically, black is displayed in this case. Moreover, in the reflective region, the light, which comes from above the panel passes through the circularly polarizing plate and enters the liquid crystal layer 40, is reflected by the reflective electrode 20 to travel in the upward direction, and is then blocked by the circularly polarizing plate placed above the panel. Accordingly, black is also displayed in the reflective region.

When a voltage which is higher than the specific voltage (threshold voltage) is applied between the common electrode 34 and both of the transparent electrode 20 and the reflective electrode 21, the liquid crystal molecules in the liquid crystal layer 40 are aligned in an oblique direction with respect to the substrate surfaces. In this way, the light emitted from the backlight unit 7 passes through both the circularly polarizing plate placed below the panel and the transparent electrode 21, and then enters the liquid crystal layer 40. In the liquid crystal layer 40, the polarization direction of the light is changed, and thereby the light can pass through the circularly polarizing plate placed above the panel. Specifically, a bright color is displayed in the transmissive region. In a similar way, also in the reflective region, as for the light, which comes from above the liquid crystal panel, passes through the circularly polarizing plate to enter the liquid crystal layer 40, and is reflected by the reflective electrode 20 to travel in the upward direction, the polarization direction of the light is changed as the light passes through the liquid crystal layer 40 and thereby the light can pass through the circularly polarizing plate placed above the panel.

It becomes possible to control the amount of light emitted upward from the liquid crystal panel 5 by controlling a voltage applied between the common electrode 34 and both of the transparent electrode 21 and the reflective electrode 20. In addition, it is made possible to display a desired image on the liquid crystal panel 5 by controlling the amount of emitted light for every picture element.

Incidentally, in the transflective liquid crystal display device having a structure shown in FIGS. 1 to 3, while light passes through the liquid crystal layer 40 only one time in the transmissive region, light passes through the liquid crystal layer 40 two times (to and fro) in the reflective region. Accordingly, there arises difference between the lights passing through the transmissive region and the reflective region as to the variances in the polarizing direction, and therefore the amount of light emitted upward from the panel unfavorably differs between the regions even if the same amount of lights enter the transmissive region and the reflective region. For this reason, even when a voltage applied is appropriately set for the device to exhibit an excellent display performance when the device is used as a transmissive liquid crystal display device, for example, excellent display cannot be achieved if the liquid crystal display device is used as a reflective liquid crystal display device.

There has been proposed a technique in which a thick insulating film is formed under the reflective electrode such that the cell thickness in the reflective region becomes half the cell thickness in the transmissive region. However, there arises a problem that the manufacturing cost is increased because of an increase in the number of manufacturing processes.

Japanese Patent Application Laid-Open Disclosure No. 2000-147455 proposes a transflective liquid crystal display device which changes the grayscale level depending on the on/off state of a backlight (light source). However, in the transflective liquid crystal display device disclosed in Japanese Patent Application Laid-Open Disclosure No. 2000-147455, the same voltage is always applied to a transparent electrode and to a reflective electrode, and accordingly the display quality (chromaticity among others) of images is deteriorated depending on conditions.

In addition, Japanese Patent Application Laid-Open Disclosure No. 2002-333870 discloses a liquid crystal display device in which one picture element region is divided into a plurality of sub-picture element regions, and in which a TFT and a transparent electrode are formed in each sub-picture element region. However, this liquid crystal display device is one which displays grayscale on the basis of digital image signals without employing a digital/analog conversion circuit, and therefore cannot be applied to a transflective liquid crystal display device.

SUMMARY OF THE INVENTION

Accordingly, it is an object of the present invention to provide a transflective liquid crystal display device which is capable of exhibiting excellent display quality when used either as a transmissive liquid crystal display device or as a reflective liquid crystal display device.

The foregoing problems can be solved by a transflective liquid crystal display device which is configured of first and second substrates and a liquid crystal layer placed between the first and second substrates, and which includes a reflective region for controlling the amount of reflected light and a transmissive region for controlling the amount of transmitted light, the transflective liquid crystal display device including: a reflective electrode placed on the reflective region of the first substrate; a transparent electrode which is placed on the transmissive region of the first substrate and is electrically isolated from the reflective electrode; a first thin film transistor which is formed on the first substrate and is connected to the reflective electrode; a second thin film transistor which is formed on the first substrate and is connected to the transparent electrode; and a common electrode which is formed on the second substrate and is placed to face both the reflective electrode and the transparent electrode.

In the present invention, the first thin film transistor is connected to the reflective electrode and the second thin film transistor is connected to the transparent electrode. Accordingly, it is possible to supply individual data signals respectively to the reflective electrode and the transparent electrode by controlling the first and second thin film transistors, and therefore reflectance-applied voltage characteristic (R-V characteristic) in the reflective region can be substantially matched to transmittance-applied voltage characteristic (T-V characteristic) in the transmissive region. For this reason, large change in brightness, contrast, and color difference between the cases where the transflective liquid crystal device is used as a transmissive liquid crystal display device and where used as a reflective liquid crystal display device can be avoided, providing excellent display quality either when the transflective liquid crystal device of the present invention is used as a transmissive liquid crystal display device or when used as a reflective liquid crystal display device.

DESCRIPTION OF THE PREFERRED EMBODIMENT

Hereinafter, embodiments of the present invention will be described with reference to accompanying drawings.

First Embodiment

Figure 1:
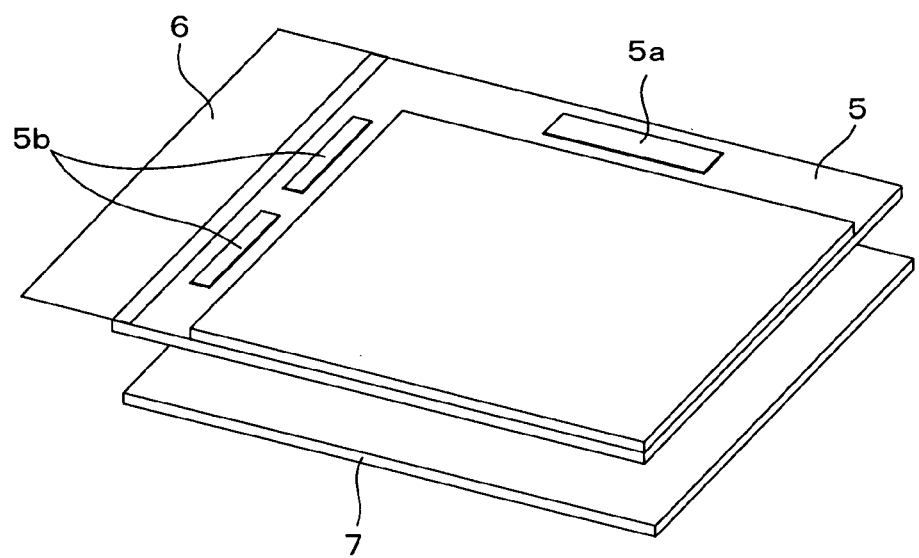
FIG. 1 is a perspective view showing the configuration of a conventional transflective liquid crystal display device.
Figure 2:
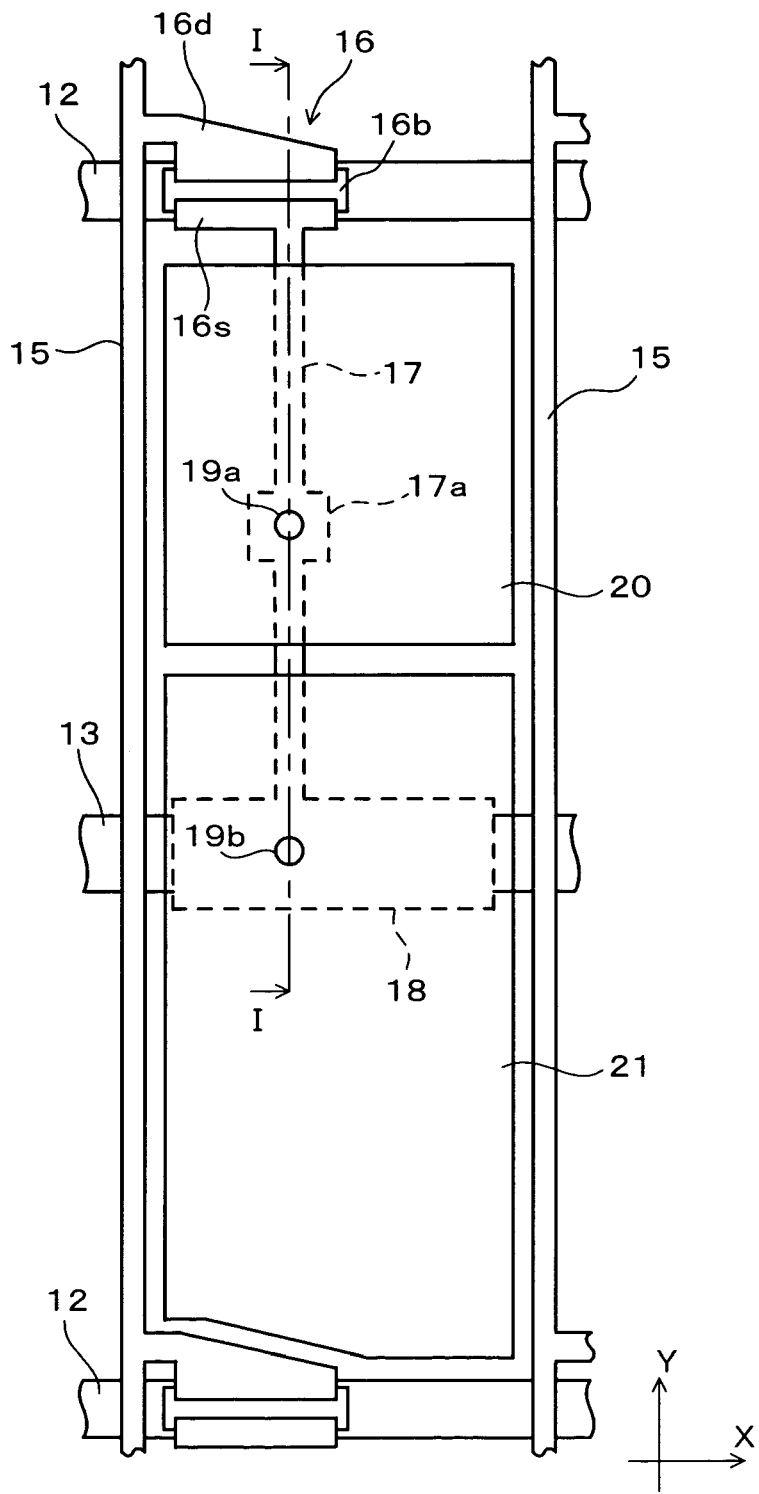
FIG. 2 is a plan view showing one picture element of the same transflective liquid crystal display device.
Figure 3:
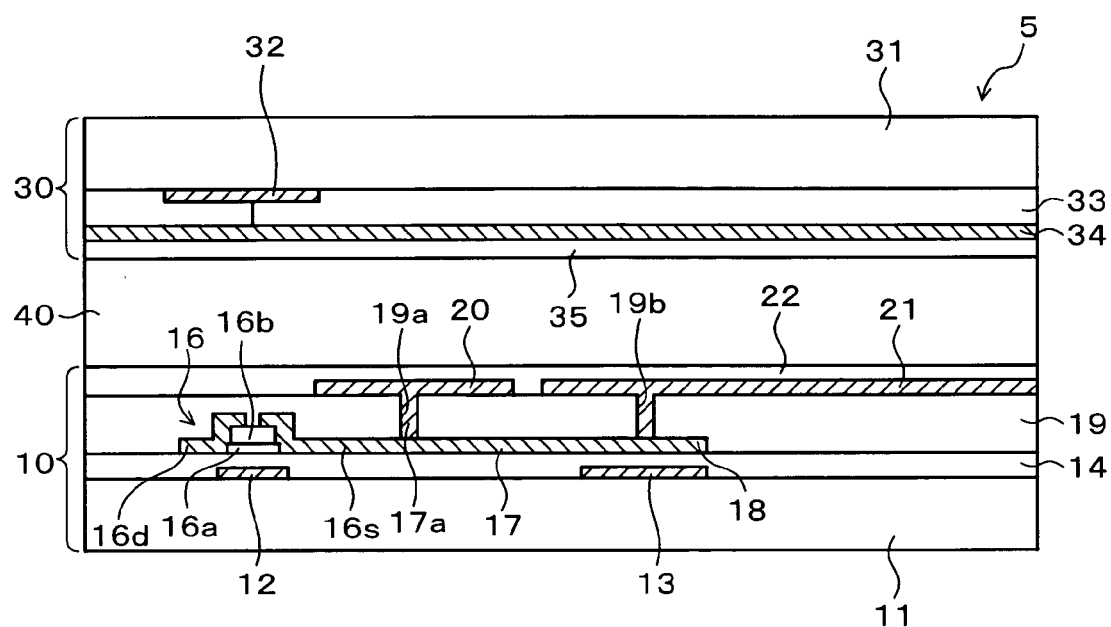
FIG. 3 is a cross-sectional view taken along the I-I line in FIG. 2.
Figure 4:
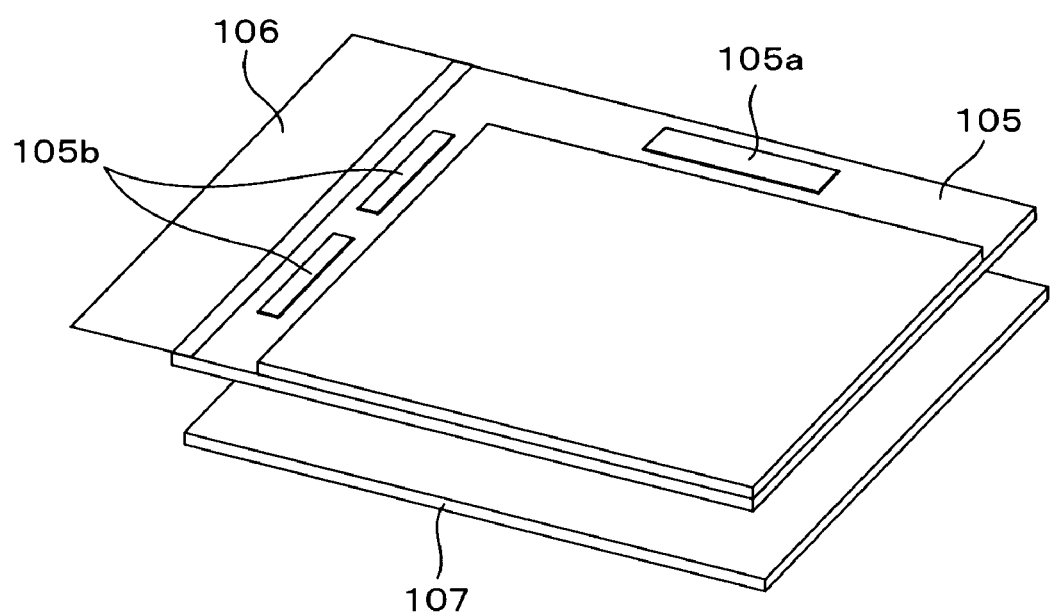
FIG. 4 is a perspective view showing the configuration of a transflective liquid crystal display device of a first embodiment of the present invention.
Figure 5:
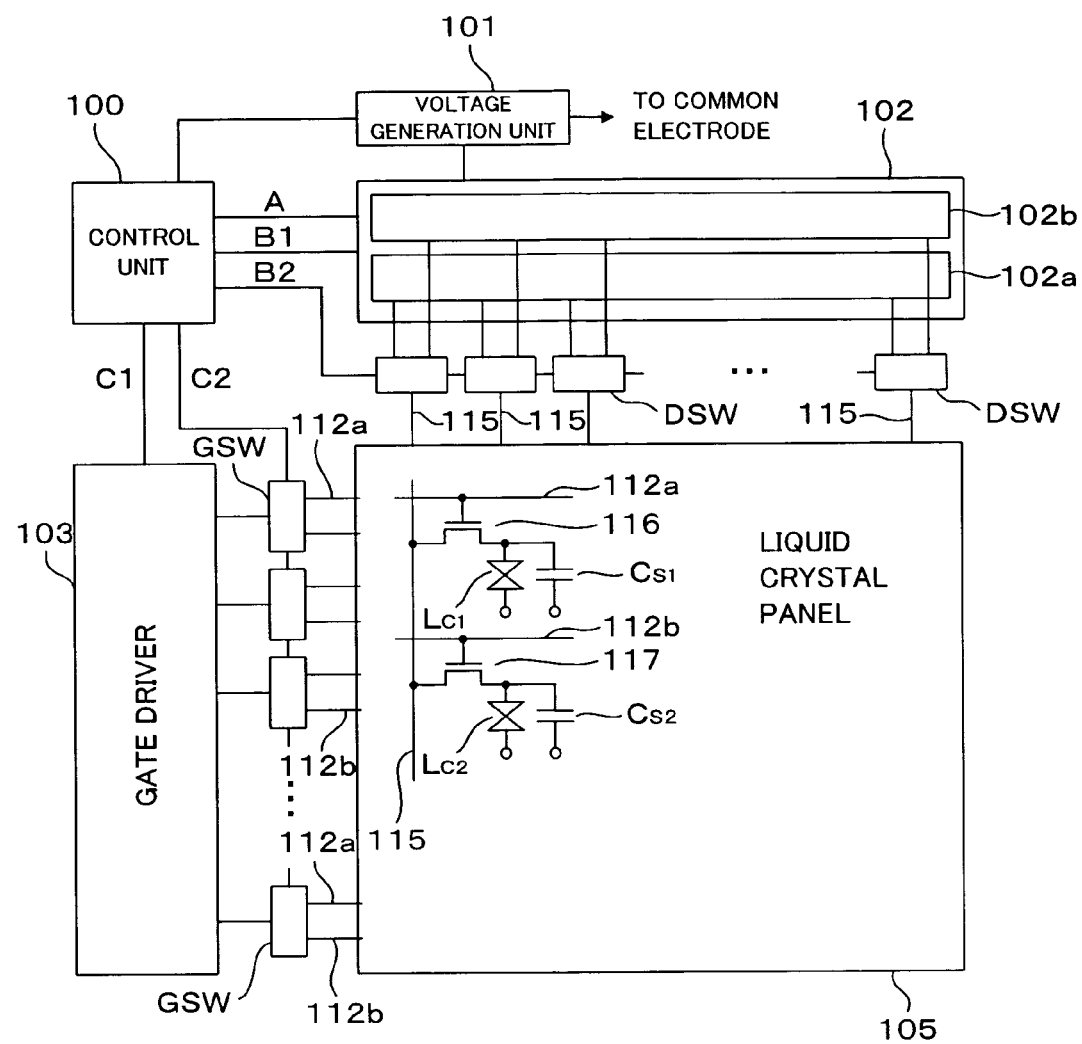
FIG. 5 is a block diagram showing the circuit configuration of the same transflective liquid crystal display device.

FIG. 4 is a perspective view showing the configuration of a transflective liquid crystal display device of a first embodiment of the present invention. FIG. 5 is a block diagram showing the circuit configuration of the same transflective liquid crystal display device. Note that, in this embodiment, a description will be given of an example in which the present invention is applied to a VA mode transflective liquid crystal display device.

As shown in FIG. 4, the transflective liquid crystal display device of this embodiment includes a liquid crystal panel 105, a drive circuit board 106 connected to the liquid crystal panel 105, a backlight unit 107 placed on one surface side of the liquid crystal panel 105 (under the liquid crystal panel 105 in FIG. 4), and a pair of circularly polarizing plates (not shown) placed to sandwich the liquid crystal panel 105.

As shown in FIG. 5, a drive circuit which drives the liquid crystal panel 105 includes a control unit 100, a voltage generation unit 101, a data driver 102, data signal selection switches DSW, a gate driver 103 and gate signal selection switches GSW. In this embodiment, it is assumed that the control unit 100 and the voltage generation unit 101 are realized by ICs mounted on the drive circuit board 106, and that the data driver 102, the data signal selection switches DSW, the gate driver 103 and the gate signal selection switches GSW are realized by ICs 105a and 105b mounted on the liquid crystal panel 105.

In the display unit of the liquid crystal panel 105, a number of picture elements are placed in matrix arrangement. Each of the picture elements includes first and second TFTs 116 and 117, a first liquid crystal cell $L_{C1}$, a first auxiliary capacitor $C_{S1}$ connected to the first liquid crystal cell $L_{C1}$ in parallel, a second liquid crystal cell $L_{C2}$ and a second auxiliary capacitor $C_{S2}$ connected to the second liquid crystal cell $L_{C2}$ in parallel.

As will be described later, the first liquid crystal cell $L_{C1}$ includes a reflective electrode, a common electrode and a liquid crystal layer placed therebetween. The second liquid crystal cell $L_{C2}$ includes a transparent electrode, a common electrode and a liquid crystal layer placed therebetween. In addition, each of the first and second auxiliary capacitors $C_{S1}$ and $C_{S2}$ includes an auxiliary capacitor bus line, an auxiliary capacitor electrode and an insulating film (dielectric film) placed therebetween.

The drain electrodes of the TFTs 116 and 117 are connected to the same data bus line 115. The gate electrode of the TFT 116 is connected to a first gate bus line 112a, and the source electrode is connected to the first liquid crystal cell $L_{C1}$ and the first auxiliary capacitor $C_{S1}$. In addition, the gate electrode of the TFT 117 is connected to a second gate bus line 112b, and the source electrode is connected to the second liquid crystal cell $L_{C2}$ and the second auxiliary capacitor $C_{S2}$.

The control unit 100 receives a display signal, a horizontal synchronizing signal and a vertical synchronizing signal from devices such as computers (not shown). The control unit 100 then outputs a display signal A and a timing signal B1 to the data driver 102, outputs a timing signal B2 to the data signal selection switches DSW, outputs a timing signal C1 to the gate driver 103, and outputs a timing signal C2 to the gate signal selection switches GSW.

The voltage generation unit 101 generates a common voltage to be supplied to a common electrode, which will be described later, and a voltage which is used as reference when a data signal is generated in the data driver 102.

The data driver 102 includes a first data driver 102a and a second data driver 102b. The first data driver 102a generates a reflective electrode data signal for each data bus line on the basis of the display signal A and the timing signal B1. In a similar way, the second data driver 102b generates a transparent electrode data signal for each data bus line on the basis of the display signal A and the timing signal B1.

In response to the timing signal B2 received from the control unit 100, the data signal selection switches DSW outputs the data signal outputted from the first data driver 102a or the data signal outputted from the second data driver 102b to the data bus line 115 in such a manner that the signals are switched to each other in one horizontal synchronization period.

On the basis of the timing signal C1 received from the control unit 100, the gate driver 103 is initialized at the start of one frame period and sequentially outputs scan signals to the output terminals thereof at the timing synchronized with each horizontal synchronization period. The gate selection switches GSW receive scan signals from the gate driver 103 and, in response to the timing signal C2 outputted from the control unit 100, sequentially outputs pulse-like gate signals to the first gate bus lines 112a and the second gate bus lines 112b in one horizontal synchronization period.

In this embodiment, the reflective electrode data signals are outputted from the first data driver 102a to the data bus lines 115 via the data signal selection switches DSW at a time when the gate signal is outputted to the first gate bus line 112a. At this moment, the TFTs 116 connected to the first gate bus line 112a are turned on, and the reflective electrode data signals are written into the liquid crystal cell $L_{C1}$ and the auxiliary capacitor $C_{S1}$. In addition, the transparent electrode data signals are outputted from the second data driver 102b to the data bus lines 115 via the data signal selection switches DSW at a time when the gate signal is outputted to the second gate bus line 112b. At this moment, the TFTs 117 connected to the second gate bus line 112b are turned on, and the transparent electrode data signals are written into the liquid crystal cell $L_{C2}$ and the auxiliary capacitor $C_{S2}$.

Figure 6:
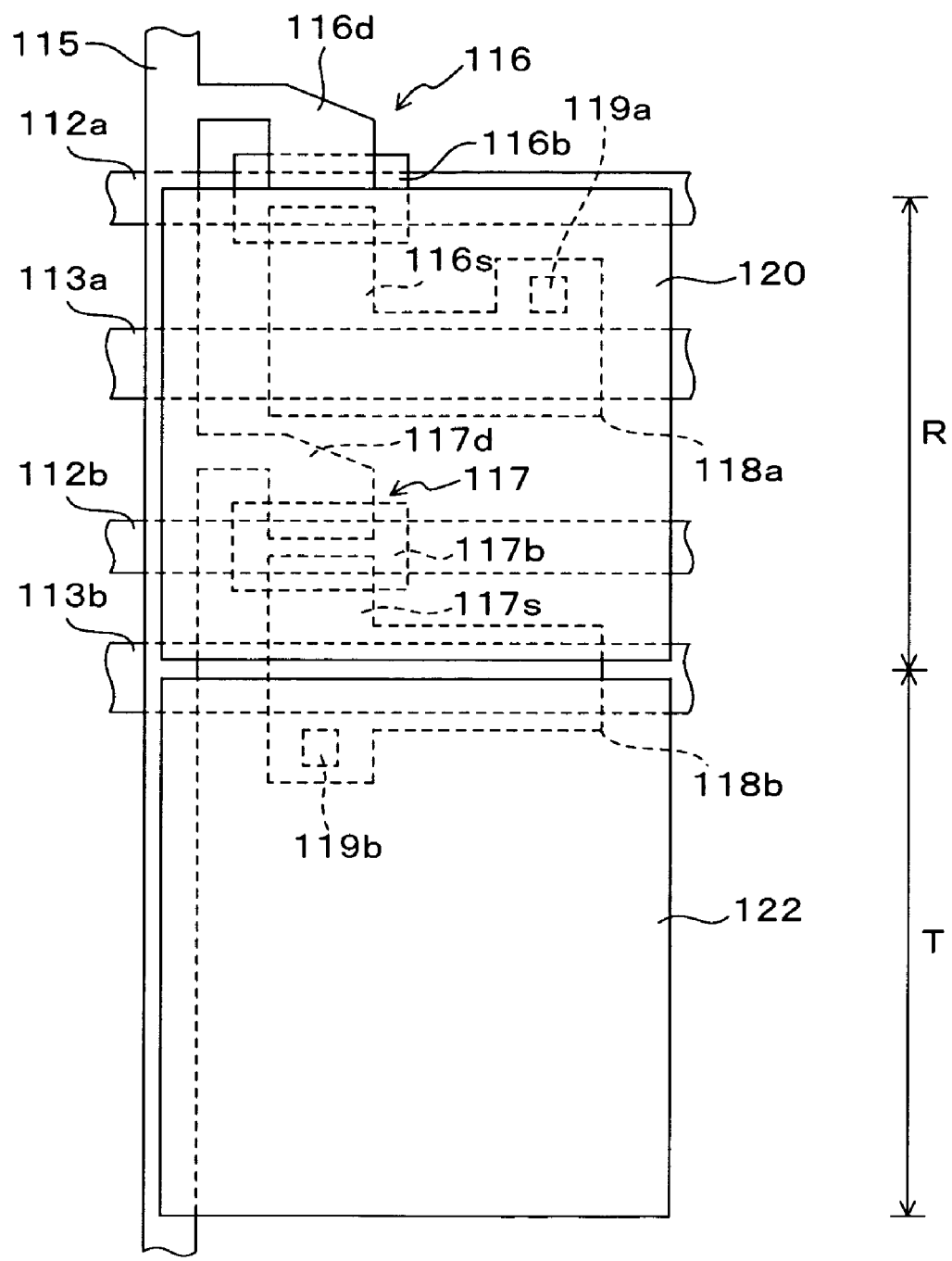
FIG. 6 is a plan view showing a region of one picture element of a liquid crystal panel of the transflective liquid crystal display device of the first embodiment.
Figure 7:
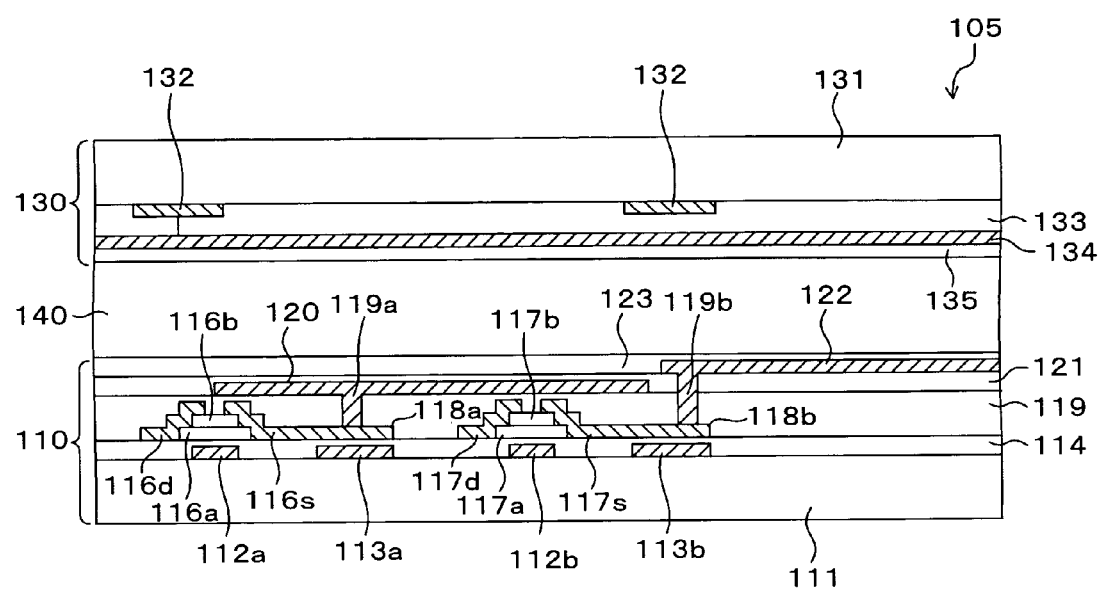
FIG. 7 is a schematic cross-sectional view of the region of one picture element of FIG. 6.

FIG. 6 is a plan view showing a region of one picture element of the liquid crystal panel 105. FIG. 7 is a schematic cross-sectional view of the region of one picture element of FIG. 6.

As shown in FIG. 7, the liquid crystal panel 105 includes a TFT substrate 110, an opposing substrate 130 and a liquid crystal layer 140 formed of vertical alignment-type liquid crystals (liquid crystals having negative dielectric anisotropy) which is sealed between the substrates. As shown in FIG. 6, the TFT substrate 110 includes the first and second gate bus lines 112a and 112b extending in the horizontal direction, first and second auxiliary bus lines 113a and 113b also extending in the horizontal direction and the data bus lines extending in the vertical direction.

In the transflective liquid crystal display device of this embodiment, the first gate bus lines 112a and the data bus lines 115, which are regarded as demarcation lines, define each picture element region. Moreover, beginning at the top of one picture element region, the first gate bus line 112a, the first auxiliary capacitor bus line 113a, the second gate bus line 112b and the second auxiliary capacitor bus line 113b are sequentially arranged thereon in this order. Furthermore, one picture element region is divided into two regions of a reflective region R and a transmissive region T by the second auxiliary capacitor bus line 113b which crosses almost the center of the picture element region. A reflective electrode 120 made of metal, such as Al, is formed in the reflective region R. A transparent electrode 122 made of a transparent conductive material, such as ITO, is formed in the transmissive region T.

Moreover, in this embodiment, the two TFTs 116 and 117 and the two auxiliary capacitor electrodes 118a and 118b are formed in each picture element. The first TFT 116 uses a part of the first gate bus line 112a as a gate electrode. A source electrode 116s and a drain electrode 116d are placed with the first gate bus line 112a interposed therebetween. The drain electrode 116d of the first TFT 116 is connected to the data bus line 115 placed on the left side of the picture element region. The first gate bus line 112a and the first TFT 116 are placed on the boundary portion of the picture element region.

The second TFT 117 uses a part of the second gate bus line 112b as a gate electrode. A source electrode 117s and a drain electrode 117d are placed with the second gate bus line 112b interposed therebetween. The drain electrode 117d of the TFT 117 is also connected to the data bus line 115 placed on the left side of the picture element region. The second gate bus line 112b and the second TFT 117 are placed below the reflective electrode 120.

The first auxiliary capacitor electrode 118a is placed on the position facing the first auxiliary capacitor bus line 113a with a first insulating film 114 interposed therebetween, thereby constituting the first auxiliary capacitor $C_{S1}$ together with the first auxiliary capacitor bus line 113a and the first insulating film 114. The first auxiliary capacitor electrode 118a is connected to the source electrode 116s of the first TFT 116 and is electrically connected to the reflective electrode 120 via a contact hole 119a. The first auxiliary capacitor bus line 113a and the first auxiliary capacitor electrode 118a are placed below the reflective electrode 120.

In a similar way, the second auxiliary capacitor electrode 118b is placed on the position facing the second auxiliary capacitor bus line 113b with the first insulating film 114 interposed therebetween, thereby constituting the second auxiliary capacitor $C_{S2}$ together with the second auxiliary capacitor bus line 113b and the insulating film 114. The second auxiliary capacitor electrode 118b is connected to the source electrode 117s of the second TFT 117 and is electrically connected to the transparent electrode 122 via a contact hole 119b. The second auxiliary capacitor bus line 113b and the second auxiliary capacitor electrode 118b are placed on the boundary portion between the reflective region R and the transmissive region T.

Hereinafter, the layered structure of the TFT substrate 110 and the opposing substrate 130 will be described with reference to FIG. 7.

The first and second gate bus lines 112a and 112b and the first and second auxiliary capacitor bus lines 113a and 113b, each of which is made of a metal film such as a Cr film or a laminated film of Al—Ti, are formed on a glass substrate 111 used as the base for the TFT substrate 110. In addition, the first insulating film (gate insulating film) 114, which covers these first and second gate bus lines 112a and 112b as well as the first and second auxiliary capacitor bus lines 113a and 113b, is formed on the glass substrate 111. The first insulating film 114 is formed of, for example, $SiO_2$ or SiN.

Semiconductor films (amorphous silicon film or polysilicon film) 116a and 117a, which respectively constituting active layers of the TFTs 116 and 117, are formed on predetermined regions of the first insulating layer 114. In addition, channel protection films 116b and 117b made of SiN are respectively formed on the regions of the semiconductor films 116a and 117a to be a channel. The source electrode 116s and the drain electrode 116d of the TFT 116 are formed with the channel protection film 116b interposed therebetween. The source electrode 117s and the drain electrode 117d of the TFT 117 are formed with the channel protection film 117b interposed therebetween.

The drain electrodes 116d and 117d of the TFTs 116 and 117 are connected to the same data bus line 115. Further, the source electrode 116d of the TFT 116 is connected to the auxiliary capacitor electrode 118a formed on the insulating film 114. The source electrode 117s of the TFT 117 is connected to the auxiliary capacitor electrode 118b. In other words, all of these data bus line 115, source electrodes 116s and 117s, drain electrodes 116d and 117d and auxiliary capacitor electrodes 118a and 118b are formed in the same layer.

All of these data bus line 115, source electrodes 116s and 117s, drain electrodes 116d and 117d and auxiliary capacitor electrodes 118a and 118b are covered with an second insulating film 119 made of, for example, $SiO_2$ or SiN. The reflective electrode 120 made of, for example, Al is formed on the second insulating film 119. The reflective electrode 120 is electrically connected to the auxiliary capacitor electrode 118a via the contact hole 119a formed in the second insulating film 119.

A third insulating film 121 made of, for example, SiN is formed on the second insulating film 119, and the surface of the reflective electrode 120 is covered with the third insulating film 121. The transparent electrode 122 made of a transparent material such as ITO is formed on the third insulating film 121. The transparent electrode 122 is electrically connected to the auxiliary capacitor electrode 118b via the contact hole 119b formed in the second and third insulating films 119 and 121. The surfaces of the third insulating film 121 and the transparent electrode 122 are covered with a vertical alignment film 123 made of polyimide or the like.

Meanwhile, a black matrix 132 and a color filter 133 are formed on a glass substrate 131 (lower surface in FIG. 7) which is the base for the opposing substrate 130. The black matrix 132 is formed of, for example, a light blocking material such as Cr, and is placed on positions facing the regions on the TFT substrate 110, where the gate bus line 112a, the auxiliary capacitor electrode 113b, and the data bus line 115 are to be formed.

The color filter 133 is classified into three types of red (R), green (G), and blue (B), each of which selectively allows light having a predetermined wavelength range to pass through. The color filter 133 of any one color is placed in each picture element, and three picture elements of red (R), green (G), and blue (B) which are adjacently placed constitute one pixel, thereby making it possible to display various colors.

A common electrode 134 is formed on the color filter 133 (lower surface in FIG. 7) so as to face both the reflective electrode 120 and the transparent electrode 122 of each picture element. The surface of the common electrode 134 is covered with an alignment film 135 made of polyimide or the like.

Figure 8:
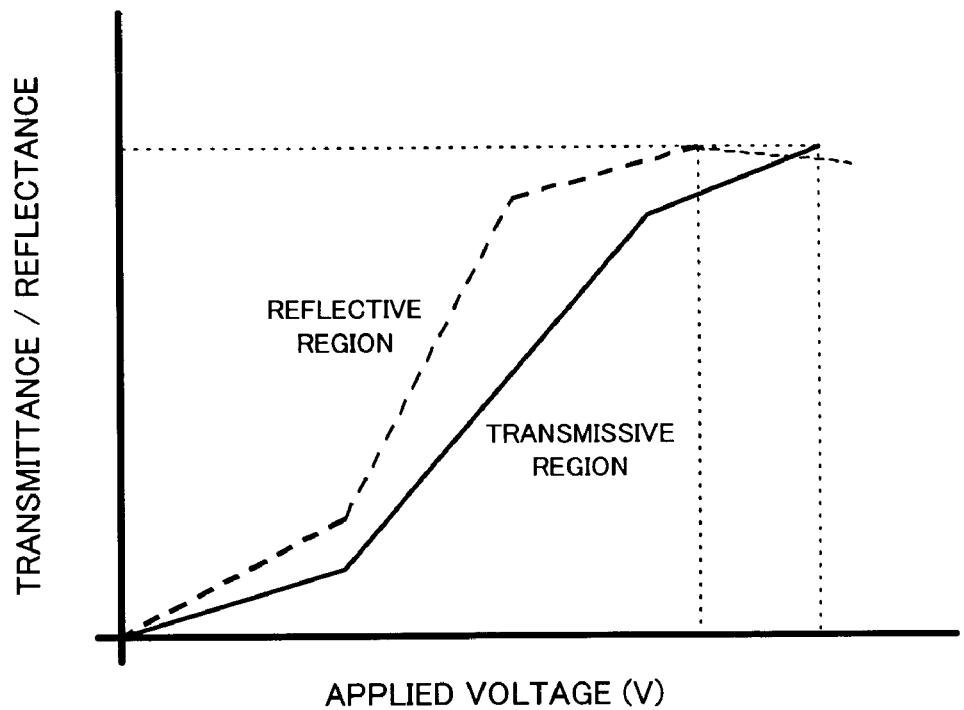
FIG. 8 is a graph showing transmittance-applied voltage characteristic in the transmissive region and reflectance-applied voltage characteristic in the reflective region.

FIG. 8 is a graph showing transmittance-applied voltage characteristic (T-V characteristic) in the transmissive region and reflectance-applied voltage characteristic (R-V characteristic) in the reflective region, in which the horizontal axis represents the applied voltage and the vertical axis represents transmittance and reflectance. As shown in FIG. 8, if it is assumed that the same voltage is applied to the transmissive electrode and to the reflective electrode, even when a voltage applied is appropriately set for the device to exhibit an excellent display characteristic as a transmissive liquid crystal display device, resulting brightness becomes higher than the intended brightness, and desired colors cannot be displayed. In order to avoid such a problem, the voltage applied when the transflective liquid crystal display device is used as a reflective liquid crystal display device may be set to lower than the voltage to be applied when the liquid crystal display device is used as a transmissive liquid crystal display device.

Figure 9:
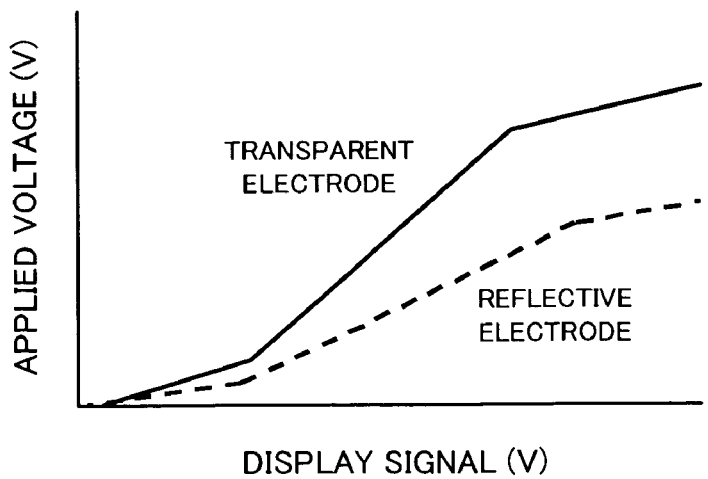
FIG. 9 is a graph showing the relation between the display signal and the voltage applied to the transparent electrode and to the reflective electrode in the first embodiment.

FIG. 9 is a graph showing the relation between the display signal and the voltage applied to the transparent electrode and to the reflective electrode in this embodiment. As shown in FIG. 9, in this embodiment, the voltage (data signal) to be applied to the transparent electrode and the voltage (data signal) to be applied to the reflective region are generated individually in the first and second data drivers 102a and 102b, so that T-V characteristic in the transmissive region matches R-V characteristic in the reflective region.

Figure 10:
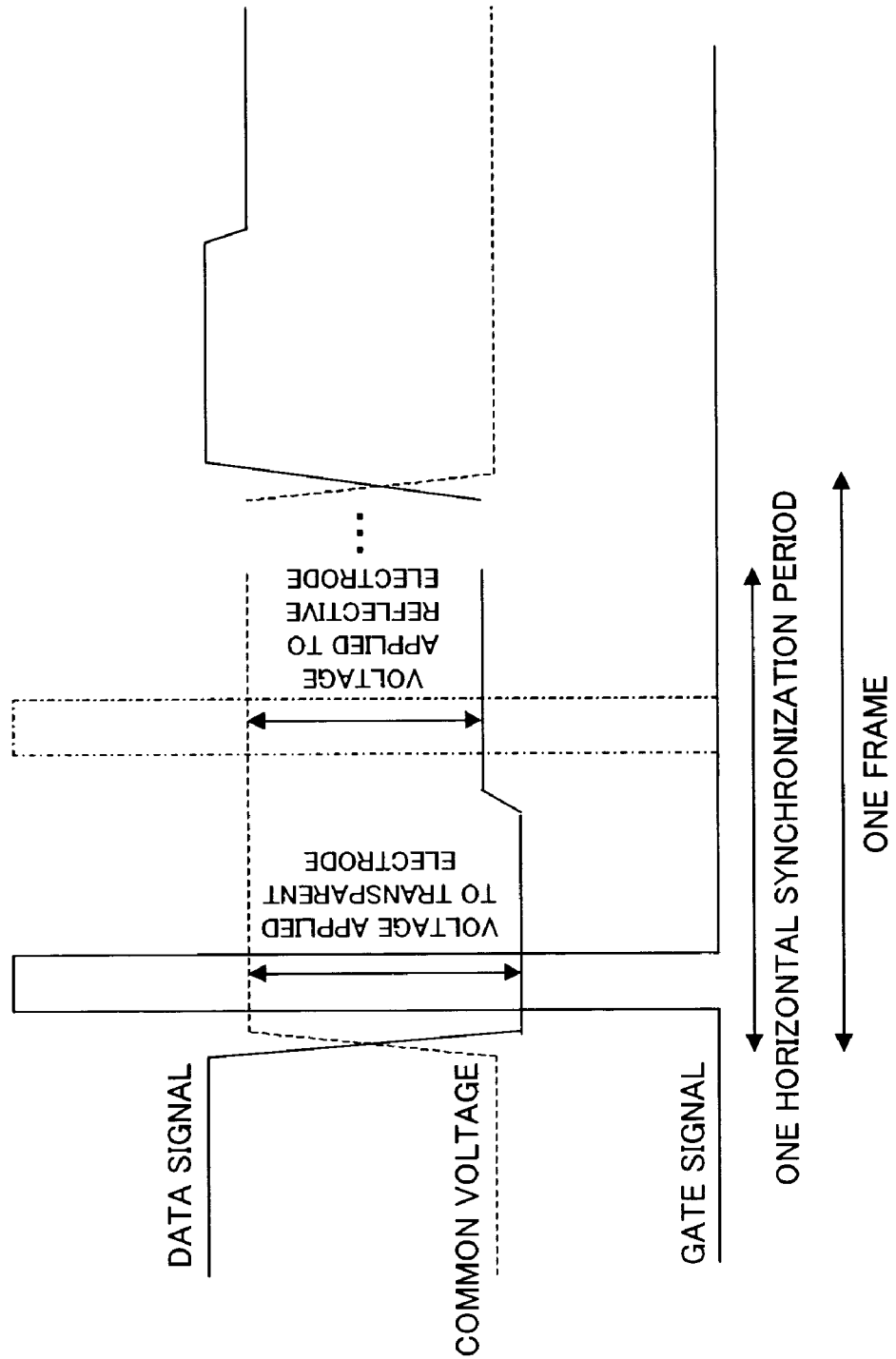
FIG. 10 is a timing chart showing a method of driving the transflective liquid crystal display device of the first embodiment.

FIG. 10 is a timing chart showing a method of driving the transflective liquid crystal display device of this embodiment. As shown in FIG. 10, in this embodiment, the transparent electrode data signals and the reflective electrode data signals are sequentially supplied to the data bus lines 115 during one horizontal synchronization period. For every frame, the common voltage is changed, and the polarity of the data signal is inverted.

The pulse-like gate signal is applied to the gate bus line 112b while the transparent electrode data signal is being applied to the data bus line 115. In this way, the TFT 117 is turned on, and the transparent electrode data signal is written into the transparent electrode 122. Thereafter, the TFT 117 is turned off, and the written data signal is stored in the liquid crystal cell $L_{C2}$ and the auxiliary capacitor $C_{S2}$ until data signals are written during the next frame. The voltage corresponding to the difference between the voltages of the transparent electrode data signal and the common electrode is applied to the transparent electrode 122. This voltage determines transmittance of the transmissive region.

In addition, the pulse-like gate signal is applied to the gate bus line 112a while the reflective electrode data signal is being applied to the data bus line 115. In this way, the TFT 116 is turned on, and the reflective electrode data signal is written into the reflective electrode 120. Thereafter, the TFT 116 is turned off, and the written data signal is stored in the liquid crystal cell $L_{C1}$ and the auxiliary capacitor Cs1 until data signals are written during the next frame. The voltage corresponding to the difference between the voltages of the reflective electrode data signal and the common electrode is applied to the reflective electrode 120. This voltage determines reflectance of the reflective region.

As described above, in this embodiment, the reflective electrode data signal and the transparent electrode data signal are individually generated in response to the display signals, and are supplied to the reflective electrode and the transparent electrode. Then, as described above, the voltages of the transparent electrode data signal and the reflective electrode data signal are set so that T-V characteristic in the transmissive region almost matches R-V characteristic in the reflective region. In this way, large change in contrast, chromaticity, and the like caused by the on/off state of the backlight, can be avoided. Accordingly, excellent display can always be achieved under well-lit conditions or under dark conditions.

Moreover, in this embodiment, not only the TFT 116 connected to the reflective electrode 120 but the TFT 117 connected to the transparent electrode 122 is formed under the reflective electrode 120. With this configuration, the aperture area of the transmissive region can be increased without reducing the area of the reflective region, and thereby bright display can be achieved.

Furthermore, in this embodiment, the voltage $V_{com}$ applied to the common electrode is changed every frame. In this way, the voltage variation amount of the data signal is made larger. By changing the voltage applied to the common electrode depending on the polarity of the data signal, the substantial voltage of the data signal, which is supplied to the reflective electrode and the transparent electrode, becomes higher. Accordingly, it is made possible to display images with high contrast even in low-voltage driven devices such as portable remote terminals.

Note that, it has been assumed in the above described first embodiment that one TFT is formed for each of the reflective electrode and the transparent electrode, however, two or more TFTs may be formed for each of the reflective electrode and the transparent electrode. In addition, the number of TFTs formed for the reflective electrode may be different from that of TFTs formed for the transparent electrode.

Second Embodiment

Figure 11:
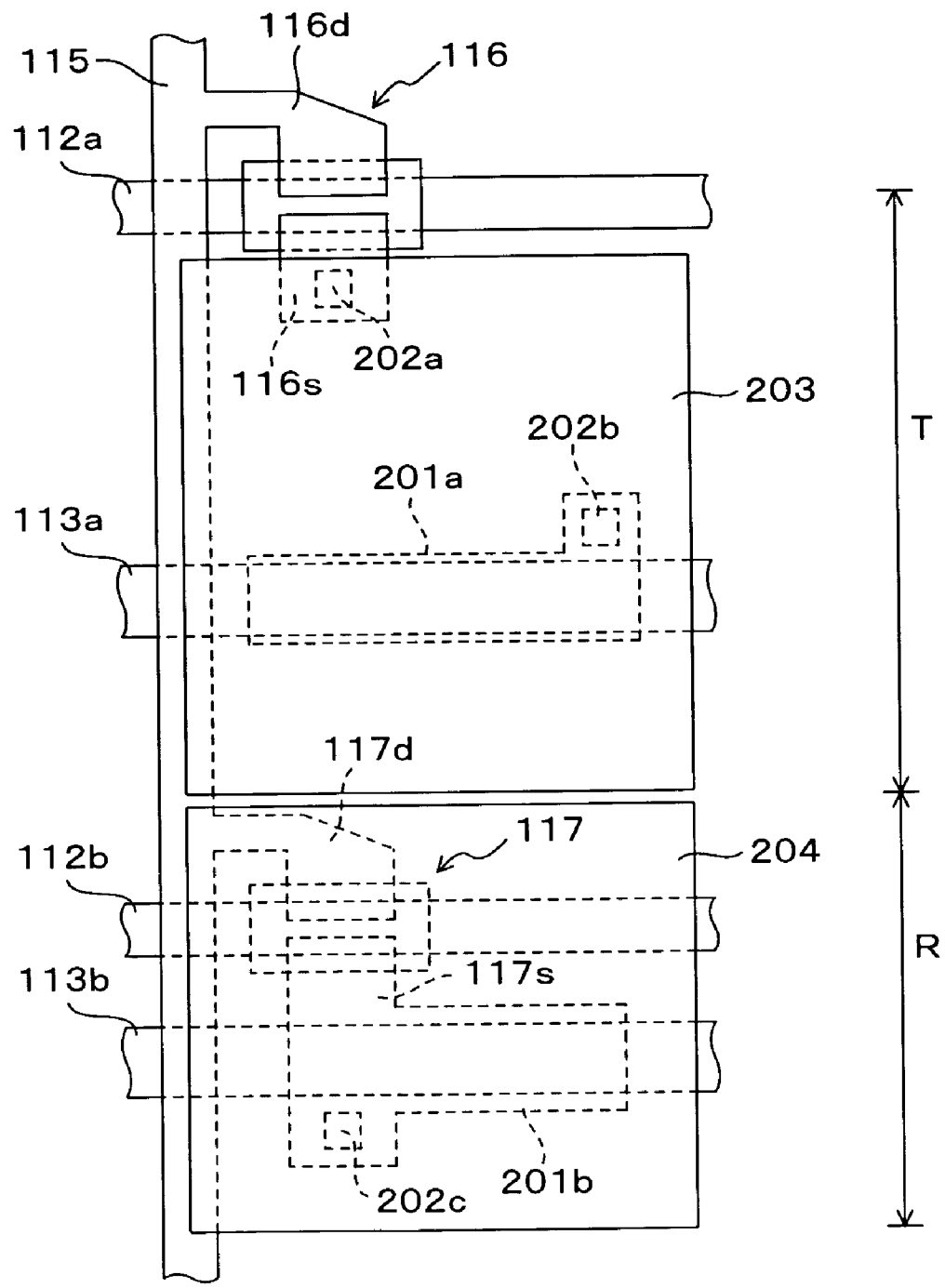
FIG. 11 is a plan view showing a transflective liquid crystal display device of a second embodiment of the present invention.

FIG. 11 is a plan view showing a transflective liquid crystal display device of a second embodiment of the present invention. In FIG. 11, the same components as in FIG. 6 are denoted by the same numerals, and the detailed description thereof will be omitted.

In this embodiment, the source electrode 116s of the first TFT 116 is electrically connected to a transparent electrode 203 via a contact hole 202a. The first auxiliary capacitor bus line 113a and a first auxiliary capacitor electrode 201a are placed below the transparent electrode 203. The first auxiliary capacitor electrode 201a is electrically connected to the transparent electrode 203 via a contact hole 202b. The source electrode 117s of the second TFT 117 is connected to a second auxiliary capacitor electrode 201b. The second auxiliary capacitor electrode 201b is electrically connected to a reflective electrode 204 via a contact hole 202c. All of the TFT 117, the second gate bus line 112b, the second auxiliary capacitor bus line 113b and the second auxiliary capacitor electrode 201b are placed below the reflective electrode 204.

When compared to the first embodiment, the aperture ratio of the transmissive region T in this embodiment is reduced by the amount of area of the first auxiliary capacitor bus line 113a and the first auxiliary capacitor electrode 201a. However, as in the case of the first embodiment, excellent display can always be achieved under well-lit conditions or under dark conditions.

Third Embodiment

Figure 12:
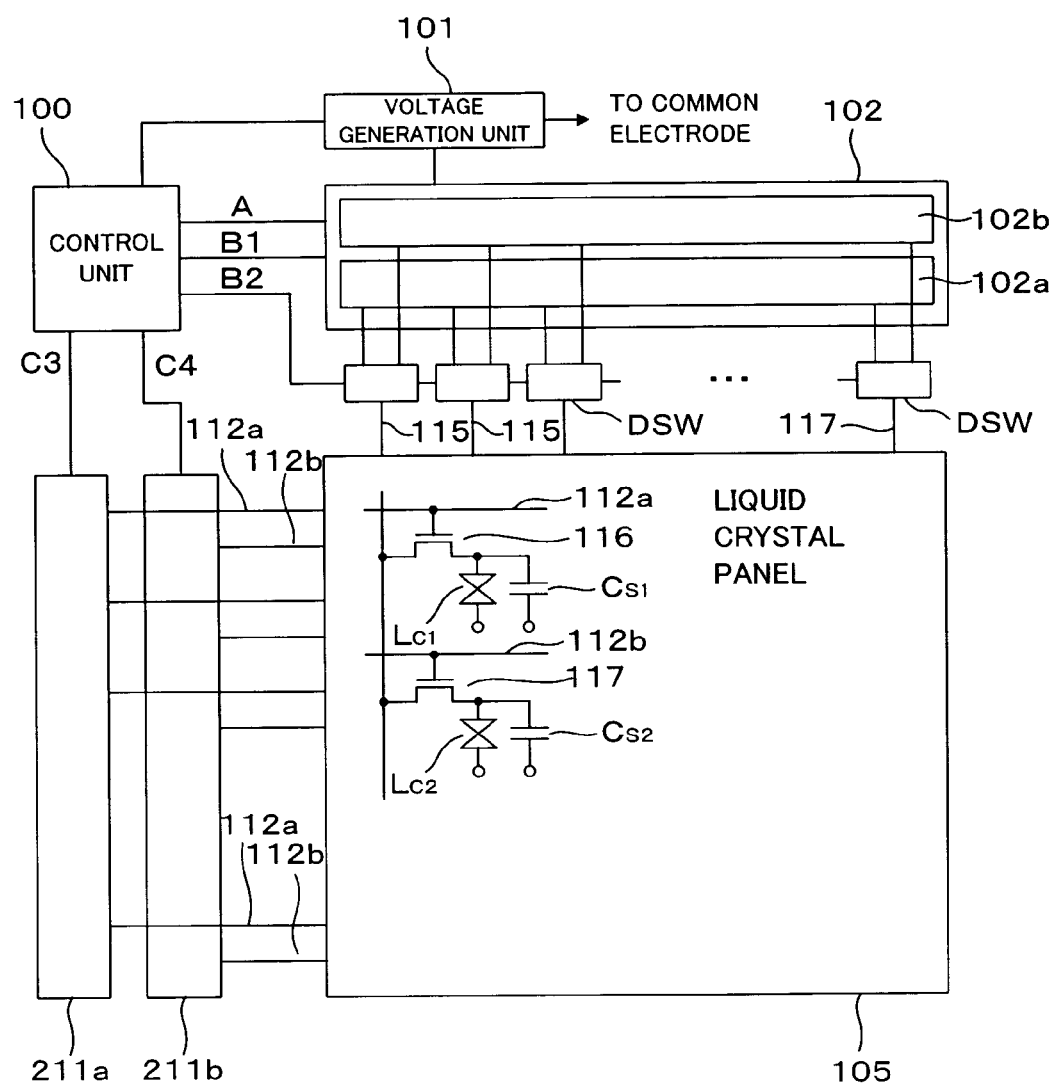
FIG. 12 is a block diagram showing the configuration of a transflective liquid crystal display device of a third embodiment of the present invention.

FIG. 12 is a block diagram showing the configuration of a transflective liquid crystal display device of a third embodiment of the present invention. In FIG. 12, the same components as in FIG. 5 are denoted by the same numerals, and the detailed description thereof will be omitted.

In the first embodiment shown in FIG. 5, gate signals to be supplied to the first and second gate bus lines 112a and 112b are generated in such a manner that the signals outputted from the gate driver 103 are switched to each other by the data signal selection switches GSW. In this case, however, the gate signal selection switches GSW are required and general-purpose gate drivers cannot be used.

Accordingly, as shown in FIG. 12, two general-purpose gate drivers 211a and 211b are used, and these general-purpose gate drivers 211a and 211b are driven by use of timing signals C3 and C4, which are synchronized with each other. In this way, during one horizontal synchronization period, the gate signals can be sequentially supplied to the first gate bus lines 112a and the second gate bus lines 112b in one picture element.

In this embodiment, special gate drivers become unnecessary, bringing about an effect that the manufacturing cost can be reduced compared with the first embodiment.

Other Embodiments

It has been assumed in the first embodiment that the data driver 102, the gate driver 103, the data signal selection switches DSW and the gate signal selection switches GSW are realized by the ICs mounted on the liquid crystal panel 105. However, they may be configured by TFTs formed outside the display region of the liquid crystal panel 105, the TFTs formed concurrently with the TFTs in the display region.

In addition, it has been assumed in the first embodiment that the individual data signals are respectively supplied to the transparent electrode 122 and the reflective electrode 120. However, an illuminance sensor may be used to measure the illuminance of the environment, and the voltages of the data signals, which are supplied to the transparent electrode 122 and the reflective electrode 120, may be controlled depending on the results of the measurement. For example, the data signal is supplied to only the transparent electrode 122 under dark conditions, the data signal is supplied to only the reflective electrode 120 under well-lit conditions, and the individual data signals are respectively supplied to the transparent electrode 122 and the reflective electrode 120 as described above under the middle-lit conditions.

Figure 13:
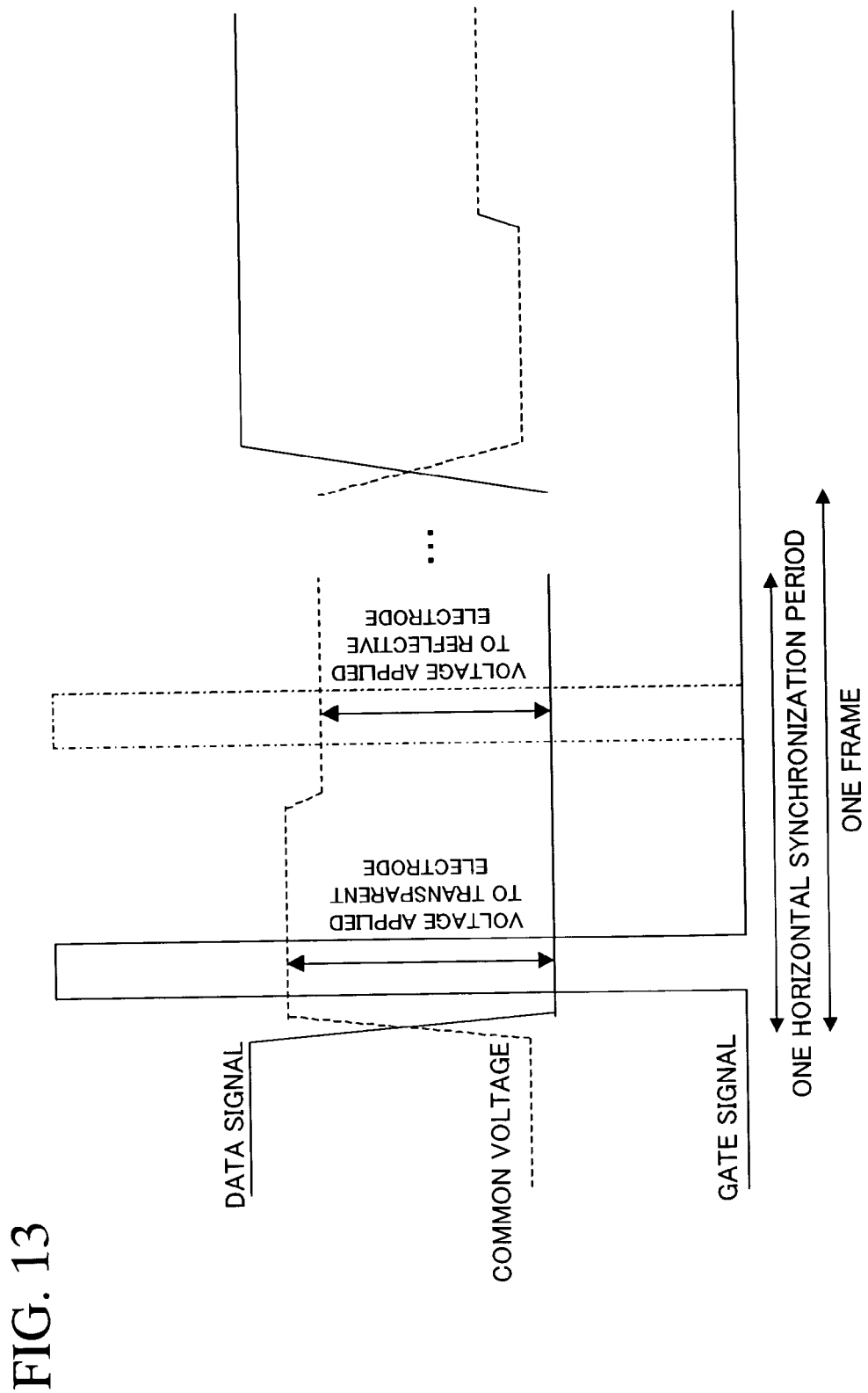
FIG. 13 is a timing chart showing a method of driving transflective liquid crystal display devices of other embodiments.

Furthermore, it has been assumed that in the first embodiment that the different data signals are respectively supplied to the reflective electrode 120 and the transparent electrode 122. However, as shown in a timing chart in FIG. 13, while the same data signals are respectively supplied to the transparent electrode and the reflective electrode, the voltage applied to the common electrode is changed, so that the voltages applied to the transparent electrode and the reflective electrode become substantially different from each other. Also in this driving method, it is possible to make T-V characteristic in the transmissive region match R-V characteristic in the reflective region. Accordingly, similar effect as that of the first embodiment can be obtained.

In each of the above-described embodiments, the description has been given of an example in which the present invention is applied to a VA mode transflective liquid crystal display device. However, the present invention can be applied to transflective liquid crystal display devices of other operation modes, as a matter of course.

What is claimed is:

1. A transflective liquid crystal display device which is configured of first and second substrates and a liquid crystal layer placed between the first and second substrates, and which includes a reflective region for controlling the amount of reflected light and a transmissive region for controlling the amount of transmitted light, the transflective liquid crystal display device comprising:

a reflective electrode placed on the reflective region of the first substrate;

a transparent electrode which is placed on the transmissive region of the first substrate and is electrically isolated from the reflective electrode;

a first thin film transistor which is formed on the first substrate and is connected to the reflective electrode;

a second thin film transistor which is formed on the first substrate and is connected to the transparent electrode;

a common electrode which is formed on the second substrate and is placed to face both the reflective electrode and the transparent electrode;

a voltage generation unit generating a common voltage which is supplied to the common electrode and is changed every frame; and a first data driver for supplying a first data signal to the reflective electrode via the first thin film transistor and a second data driver for supplying a second data signal to the transparent electrode via the second thin film transistor;

a first auxiliary capacitor connected to the reflective electrode;

a second auxiliary capacitor which is connected to the transparent electrode, wherein at least a portion of said second auxiliary capacitor is placed on a boundary portion between the reflective region and the transmissive region, where said boundary portion is a portion lacking both the reflective electrode and the transparent electrode;

wherein the first and second data drivers receive the same display signals and generate the first and second data signals such that a voltage value of the first signal is less than a voltage value of the second signal.

2. The transflective liquid crystal display device according to claim 1,
wherein the first and second thin film transistors are connected to the same data bus line.

3. The transflective liquid crystal display device according to claim 1,
wherein the second thin film transistor is covered with the reflective electrode.

4. The transflective liquid crystal display device according to claim 1, further comprising a data signal selection switch which is interposed between both of the first and second data drivers and both of the first and second thin film transistors, receives the first and second data signals outputted from the first and second data drivers, and transmits the first and second data signals to the first and second thin film transistors respectively in such a manner that the first and second data signals are sequentially switched to each other.

5. The transflective liquid crystal display device according to claim 1, further comprising:
a first gate driver for supplying a first gate signal to the gate of the first thin film transistor;
a second gate driver for supplying a second gate signal to the gate of the second thin film transistor; and
a control unit for driving the first and second gate drivers in synchronization with each other.

\* \* \* \* \*